United States Patent [19]

Meijer et al.

[11] Patent Number: 4,579,046
[45] Date of Patent: Apr. 1, 1986

[54] YIELDABLY MOUNTED LUBRICANT CONTROL ASSEMBLIES FOR PISTON RODS

[75] Inventors: Roelf J. Meijer; Benjamin Ziph; Ted M. Godett, all of Ann Arbor, Mich.

[73] Assignee: Stirling Thermal Motors, Inc., Ann Arbor, Mich.

[21] Appl. No.: 665,581

[22] Filed: Oct. 29, 1984

[51] Int. Cl.⁴ .............................................. F16J 15/18
[52] U.S. Cl. ...................................... 92/167; 91/499; 92/168; 74/18.2; 277/174; 277/176; 277/177
[58] Field of Search .................. 74/18.2; 92/165, 167, 92/168, 168 B; 277/173, 174, 176, 177, 212 FB, 212 F, 212 R, 30, 215, 103; 91/499

[56] References Cited

U.S. PATENT DOCUMENTS

| | | | |
|---|---|---|---|
| 2,881,973 | 4/1959 | Ricardo | 92/165 X |
| 3,507,584 | 4/1970 | Robbins, Jr. | 92/168 X |
| 3,582,091 | 6/1971 | Smith | 277/30 |

Primary Examiner—Leonard E. Smith
Attorney, Agent, or Firm—Stephenson and Boller

[57] ABSTRACT

Improved lubricant control assemblies for reciprocating piston rods of an engine which prevent crankcase lubricant intruding into the cylinders and fluid from the cylinders from escaping into the crankcase. Each assembly comprises a tubular scraper fitting closely onto a piston rod and yieldably mounted within the bore between cylinder and crankcase through which the piston rod extends. The yieldable mounting is by means of a compliant housing. The compliant housing allows the scraper to be displaced radially and thereby follow limited radial displacement of the piston rod while maintaining substantially full effectiveness of the scraper's action on the reciprocating piston rod. The scraper is urged into forceful contact around the piston rod by means of a crown spring which is supported on a tubular part which attaches to the compliant housing. The compliant housing comprises an outer ring portion which is threaded into the bore to mount the assembly on the engine and an inner ring portion which attaches to the tubular part. One or more intermediate ring portions may be included in the compliant housing. Each ring portion joins to its immediate ring portion(s) at only one axial end with the points of joining alternating axially from each ring to the next. A disclosed embodiment for the compliant housing comprises a one piece nylon part.

25 Claims, 4 Drawing Figures

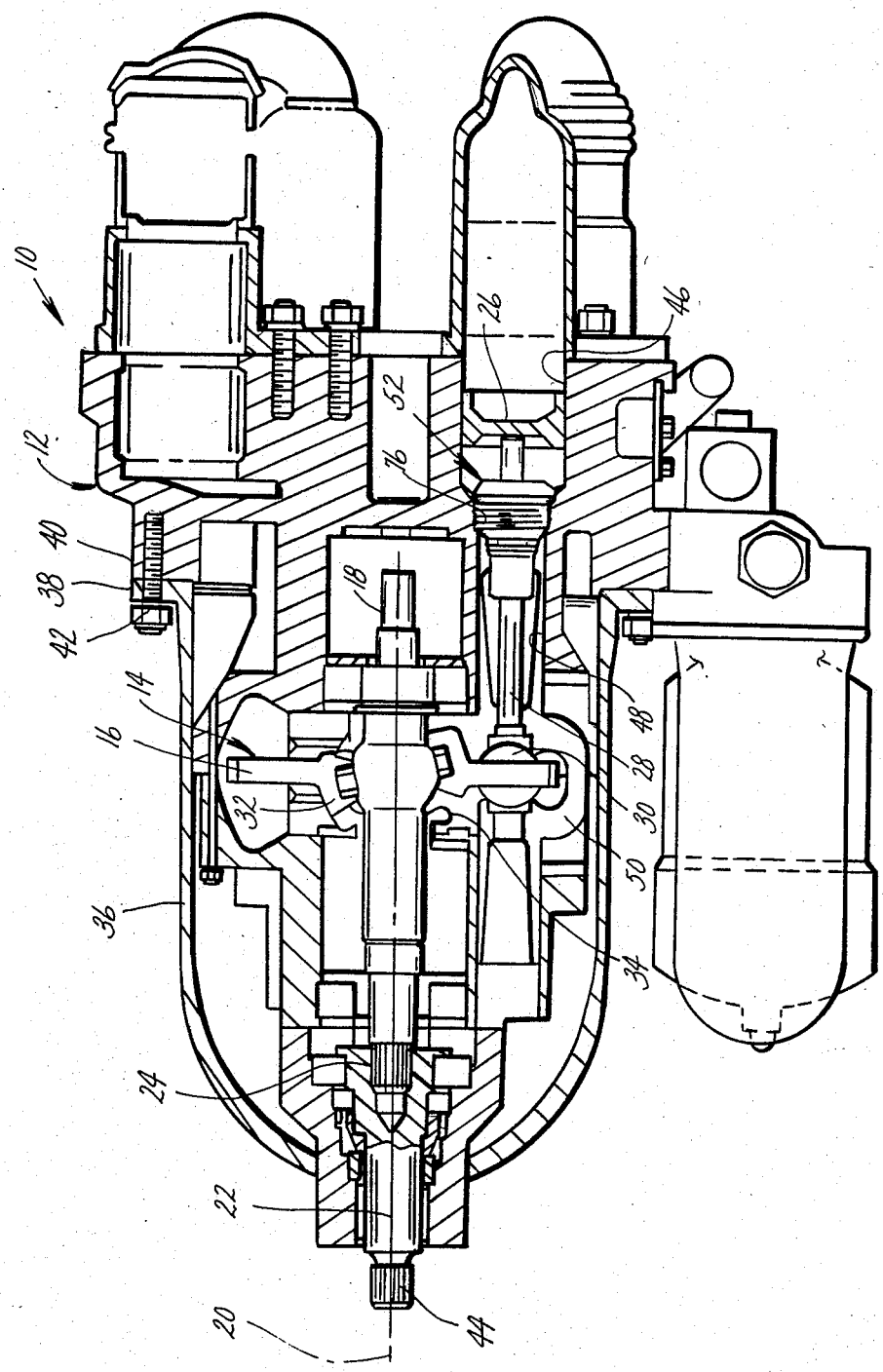

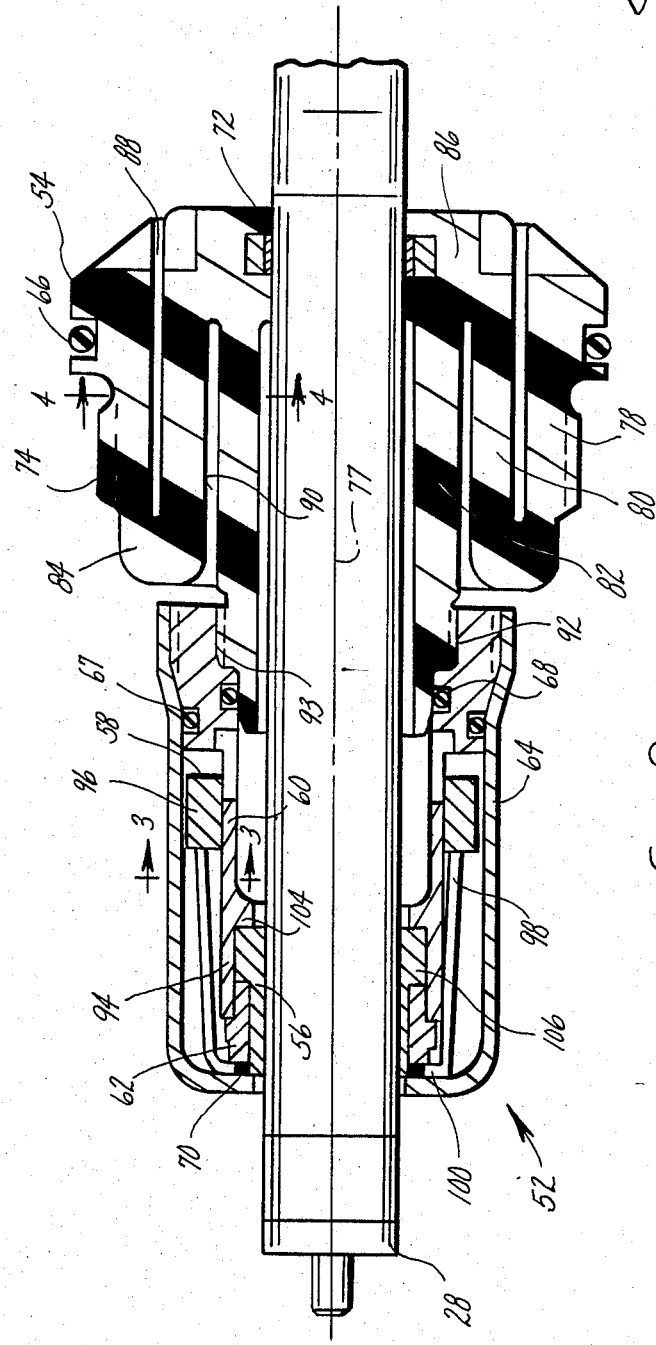
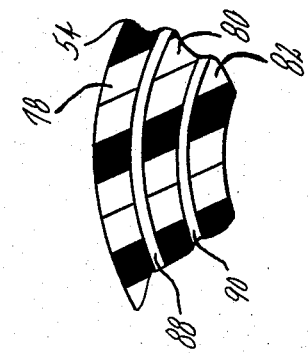
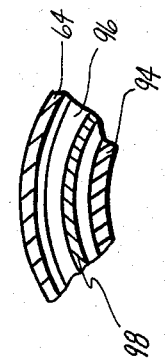

YIELDABLY MOUNTED LUBRICANT CONTROL ASSEMBLIES FOR PISTON RODS

This invention relates generally to thermal engines and is particularly concerned with an improved lubricant control assembly for a piston rod of such an engine.

In certain types of engine designs, it is necessary to provide a lubricant control assembly around a reciprocating piston rod. For example in an engine having a pressurized crankcase, such an assembly serves a purpose of preventing oil from the crankcase penetrating into the thermodynamic cycles occurring in the cylinder within which the piston which is attached to the piston rod reciprocates. Penetration of oil from the crankcase to the cylinder can in turn be conveyed to other components giving rise to deteriorating performance and/or permanent damage.

Various types of lubricant control assemblies have heretofore been proposed. A known type of lubricant control assembly is positioned on the engine housing and comprises a scraper which may take the form of a tube fitting closely onto a piston rod. Additional components are associated with the scraper to cause it to forcefully engage the piston rod and such a component may comprise a clamping ring. For example, the clamping ring may be of a circular shape fitting over one end of the tubular scraper to forcefully urge that end of the scraper against the piston rod. As the piston rod reciprocates, it passes back and forth through the scraper and the forceful engagement of one end of the scraper with the piston rod serves to prevent oil from passing from the crankcase into the cylinder.

Moreover a particular arrangement may control the separation between the crankcase and the cylinder such that the scraper controls the pumping action of oil. For example, it may be desirable to allow oil to be pumped on the upstroke so as to provide a very thin film of oil for the piston rod. The scraper may act much in the manner of a check valve on the downstroke preventing any reverse flow of fluid from the cylinder into the crankcase.

Depending upon the nature of any particular construction of such an engine, a piston rod may be subjected to forces which comprise not only axial, but also radial, components. For example, in an engine in which a swashplate is journaled for rotation on a housing and the swashplate is driven by crossheads connected to axially reciprocating pistons and piston rods, the force acting on a piston rod may be resolved into an axial component and a radial component.

The present invention arises in part through the recognition that radial forces imparted to such a piston rod that have a significant influence on the effectiveness of a piston rod lubricant control assembly. In other words if there are significant radial forces acting on a piston rod, there is a greater potential for undesired leakage of oil from the crankcase into the cylinder and loss of fluid from the cylinder to the crankcase. In other types of engines it also is possible that reciprocating piston rods may experience radial force components which can have similar adverse effects on the lubricant control assemblies.

The present invention relates to an improvement in such lubricant control assemblies which has a number of significant benefits over prior devices.

One important advantage of the present invention is that it allows a certain limited amount of radial movement of the piston rod without significantly detracting from the effectiveness of the control action. Hence the presence of such radial forces can be better tolerated.

Such limited radial movement is allowed because of a compliant housing which mounts the control assembly on the engine housing. The compliant housing is constructed and arranged to yield slightly so the scraper which forcefully engages the piston rod can follow slight radial displacements of the piston rod without loss of its effectiveness in acting upon the piston rod. An advantageous aspect also involves the use of a crown spring to provide the force on the scraper.

Moreover an assembly embodying principles of the present invention is relatively compact and has an organization and arrangement which can be readily mounted on engines of known design as well as engines of new design.

The invention can also be effective to control the lubrication of the piston rod such that for example when the piston is on the upstroke, lubrication from the crankcase is drawn as a film across the piston rod providing a desired lubrication.

These above enumerated features will become apparent in the ensuing description of the invention in which like reference numerals in the several figures designate like components. The drawings illustrate an exemplary embodiment of the invention in its presently best suited form.

BRIEF DESCRIPTION OF DRAWINGS

FIG. 1 is a longitudinal view, mostly in cross section, through an example of a heat engine containing an improved piston rod lubrication control assembly according to principles of the present invention.

FIG. 2 is an enlarged longitudinal view mostly in cross section through an improved piston rod lubrication control assembly shown in FIG. 1.

FIG. 3 is a fragmentary view taken generally in the direction of arrows 3—3 in FIG. 2.

FIG. 4 is a fragmentary view taken generally in the direction of arrows 4—4 in FIG. 2.

DESCRIPTION OF THE PREFERRED EMBODIMENT

FIG. 1 illustrates a representative thermal engine 10 containing lubricant control assemblies embodying principles of the present invention. Before describing details of the lubricant control assemblies, a general discussion of the engine construction is in order.

Engine 10 comprises a housing designated by the general reference numeral 12 and which in the engine illustrated has multiple parts assembled together.

Housing 12 contains an operating mechanism, designated by the general reference numeral 14, for converting the reciprocating motion of pistons into rotation of a drive shaft. The pistons are caused to reciprocate by working fluid conveyed to and from the cylinders within which the pistons are disposed.

The mechanism 14 includes a swashplate 16 on a shaft 18 journaled on housing 12 for rotation about an axis 20. Shaft 18 forms a first part of the engine drive shaft and there is also a second part 22 of the drive shaft which is operatively coupled with shaft 18 by a spline connection 24.

Energy is imparted to swashplate 16 by pistons 26 having piston rods 28 which act upon the swashplate at locations spaced radially outwardly of axis 20, for example, at the locations where sliders 30 are positioned in FIG. 1. The swashplate 16 is mounted on shaft 18 so as to rotate about axis 20. Crossheads which slidably connect piston rods 28 to swashplate 16 are equipped with sliders 30 which cause reciprocation of the pistons to rotate swashplate 16 and thus shaft 18.

Gears 32 and 34 are part of a mechanism which effects relative rotation between swashplate 16 and shaft 18 so as to change the angle of the swashplate 16 thereby changing the piston stroke and hence the engine power.

The illustrated engine further comprises a pressure hull 36 which has a cooperative association with housing 12. As can be seen in FIG. 1 pressure hull 36 is fitted over one axial end of the engine and includes a distal flange 38 which is disposed against and attached and sealed to a mating flange 40 of housing 12 with removable fasteners 42 used for the attachment.

The cooperative association of pressure hull 36 with housing 12 defines an interior space which is subjected to pressures different than those which may exist on the exterior of the engine. Hence there are provided suitable seals (unnumbered) between the various parts where the drive shaft extends through the hemispherical-shaped left hand end of the pressure hull as viewed in FIG. 1. The drive shaft parts are journaled on the engine housing by suitable bearing assemblies (also unnumbered). The drive shaft is provided with an external spline 44 for connecting the drive shaft to any utilization device (not shown) which is to be powered by the engine.

The engine has a number of pistons and piston rods acting on the swashplate. FIG. 1 shows one of them. The cylinder within which piston 26 reciprocates is identified by the reference numeral 46. A bore 48 is provided in housing 12 extending from the left hand end of cylinder 46, as viewed in FIG. 1, to a crankcase area 50.

A lubricant control assembly 52 is mounted on housing 12 at bore 48 for cooperative association with piston rod 28. The lubricant control assembly functions to allow the piston rod 52 to reciprocate axially while it also serves to separate cylinder 46 from crankcase 50 for the principal purposes of preventing lubricant from passing from the crankcase 50 through bore 48 and into cylinder 46 and of preventing leakage of fluid in cylinder 26 through bore 48 to crankcase 50.

Details of lubricant control assembly 52 are illustrated with reference to FIGS. 2, 3, and 4.

The preferred embodiment of lubricant control assembly comprises a plurality of component parts assembled together including a compliant housing 54, a scraper 56 and a crown spring 58. Additional structural parts include an inner part 60 extending from compliant housing 54 to scraper 56, a ring 62 between inner part 60 and scraper 56, and an outer part 64 which fits over crown spring 58 and inner part 60. The assembly also includes O-ring seals 66, 67, 68 as indicated. The preferred construction also includes a buffer 70 acting between crown spring 58 and scraper 56, and a cap seal 72 acting between compliant housing 54 and piston rod 28.

As can be appreciated, the various parts of the lubricant control 52 have central through-apertures providing for the passage of piston rod 28 through the assembly.

Lubricant control assembly 52 mounts on housing 12 within bore 48 by means of compliant housing 54. For this purpose compliant housing 54 is provided with a circumferential screw thread 74. This screw thread 74 provides for the lubricant control assembly to be threaded into complementary screw thread portion 76 of bore 48. The O-ring seal 66 is provided to assist in a leak-proof seal around the full circumference of compliant housing 54 with respect to bore 48.

Compliant housing 54 is so constructed that when it is threaded into bore 48, it can assume shapes which are slightly different from its free shape, the free shape being substantially uniform about the main central axis 77 of the assembly which ideally is coaxial with the piston rod. In the illustrated embodiment of compliant housing 54 this attribute of compliance is achieved by the particular shape of the compliant housing and the material which is used to make it.

The illustrated construction for compliant housing 54 comprises a suitable plastic such as nylon for example. The nylon part has a shape which may be considered as a succession of three axially extending concentric ring portions of different diameters. The reference numeral 78 designates the largest diameter ring portion, the reference numeral 80 the next largest, and the reference numeral 82 the smallest. As can be appreciated from consideration of the drawing figure, it is outer ring portion 78 which contains threads 74 for screwing into bore 48, and it is inner ring portion 82 which is disposed closely around piston rod 28. Thus the ring portion 80 constitutes an intermediate ring lying radially between the outer and inner ring operations 78 and 82.

One end of the intermediate ring portion 80 integrally joins with a corresponding axial end of outer ring portion 78 and the opposite axial end of intermediate ring portion 80 joins with a corresponding axial end of inner ring portion 82. Thus in the illustrated embodiment, a radially extending joining portion 84 is seen to join rings 78 and 80 and a radially extending joining portion 86 is seen to join rings 80 and 82. With this arrangement, the respective joinings of the intermediate ring portion to its immediate outer ring portion and to its inner ring portion take place at alternate axial ends.

Because the compliant housing is made from a material such as nylon it can be machined, molded, or otherwise manufactured as a unitary part. This construction of compliant housing 54 defines two circular slots extending axially into the compliant housing from opposite axial sides at different radii. These slots are identified by the reference numerals 88 and 90 with the latter being the slot of smaller radius.

Inner ring portion 82 extends axially away from the compliant housing beyond the joining portion 84 such that portion 82 has a free distal end. This end is threaded at 92 so as to allow the right hand axial end of part 60 to be threaded onto the compliant housing by means of a thread 93 on part 60. The O-ring seal 68 serves to seal between the two.

Part 60 includes an axially extending wall 94, and it is onto this axial wall 94 that the circular base 96 of crown spring 58 fits.

Crown spring 58 includes an axially extending portion 98 which extends from base 96 to terminate in a short radially inwardly directed portion 100 at an axial location which is slightly beyond the end of axial wall 94. Buffer 70 is disposed between this radially inwardly portion 100 and scraper 56.

Ring 62 is provided with a shape to fit in cooperative association with buffer 70, scraper 56, and axial wall 94 to maintain the components in a desired assembled relationship. Outer part 64 is fitted over these assembled parts and contains an internal screw thread 102 at its right hand end so as to thread onto an external thread 103 on part 60. The O-ring seal 67 provides sealing between part 60 and part 64 when the two are threaded together.

It can be seen from this construction that scraper 56 is located axially by the right hand end of scraper 56 abutting an internal shoulder 104 within axial wall 94 and by a shoulder 106 which is engaged by ring 62.

The I.D. (inside diameter) of scraper 56 is dimensioned for a very close fit on the O.D. (outside diameter) of piston rod 28. Crown spring 58 is operative via portions 98 and 100 to exert a strong radially inwardly directed forces through buffer 70 around the circumference of scraper 56 at the left hand axial end of the scraper. As a consequence, scraper 56 is forcefully circumferentially contracted against piston rod 28 at the scraper's left hand end. Necessarily this force is much greater than any other radial force acting between the scraper and the piston rod along the remainder of the scraper's I.D. The magnitude of force is a function of the characteristic of crown spring 58, and in this regard very substantial forces can be exerted to act on the scraper.

With the lubricant control assembly installed in the engine and the engine operating, piston rod 28 reciprocates axially back and forth through lubricant control assembly 52 with the two points of contact of assembly 52 with piston rod 28 being via scraper 56 and cap seal 72. The dominant action is provided via scraper 56, and therefore it is contemplated that cap seal 72 may not necessarily be required.

Because of the interaction of the crosshead with sliders 30, the piston rod will be subjected to forces which bear not only axial components, but radial ones as well. The radial forces applied to the piston rod will tend to cause the piston rod to reciprocate not only with an axial component of motion but with slight radial components of displacement as well. In other words, they may tend to bend the piston rod slightly.

The lubricant control assembly according to the present invention performs admirably despite limited components of radial motion being imparted to the piston rod as it axially reciprocates. This attribute is provided by compliant housing 54. In the illustrated embodiment it can be appreciated that compliant housing 54 enables its inner ring portion 86 to follow slight radial displacements of the piston rod while the outer ring 78 remains securely mounted in bore 48 on the housing. In other words, it may be considered that the slots 88 and 90 provide for the shape of the compliant housing to vary slightly so the inner ring portion 82 can follow slight radial displacements of the reciprocating piston rod to maintain scraper 56 coaxial with the piston rod. Because of compliant housing 54 the components of the lubricant control assembly which are attached to the left hand end of the compliant housing's inner ring portion can follow small radial displacements of the piston rod thereby maintaining substantially full effectiveness of the action of scraper 56 on piston rod 28.

Thus the invention provides an improved capability for a lubrication control assembly in those applications where radial components of force acting upon the piston rod had previously detracted from the effectiveness of the lubricant control assembly.

It will also be observed that the illustrated construction is compact and well suited for both existing engine designs as well as new engine designs.

Fabrication and assembly of the component parts of the lubricant control assembly are accomplished with conventional fabrication and assembly procedures. It will be appreciated that the various components at the left hand end are assembled together and onto the left hand end of the compliant housing such that a unitary assembly results. The unitary assembly is then threaded into the bore, for example from the right hand end as viewed in FIG. 1 before the piston is assembled. In this regard the right hand axial face of the compliant housing may be provided with a suitable wrenching surface for engagement by a suitable tool for installing and/or removing the lubricant control assembly.

Buffer 70 is preferably an elastomeric part which functions to transmit force from crown spring 58 to scraper 56 and to also perform a sealing function. Its use, however, may not be mandatory in all cases.

The particular construction of crown spring 58 may comprise the portions 98 and 100 to be in the form of a series of individual finger-like elements extending from base 96.

It will be appreciated that the diameter of the outer part 64 has a certain clearance to the wall of bore 48 when the assembly is mounted on the engine to allow for radial displacements.

Outer part 64 has a radial wall at its end which serves to axially confine the assembled parts internally thereof by radially overlapping the end of crown spring 58, buffer 70, and scraper 56. While the crown spring force is transmitted through buffer 70 to scraper 56, the buffer is sealed against both the radial wall of outer part 64 as well as the end of ring 62. The relative fits of scraper 56, ring 62, and inner part 94 allow for the operation of scraper 56 by crown spring 58 in the manner previously described.

Alternate constructions for compliant housing 54 are also contemplated. These alternate constructions may differ from that illustrated in shape and/or material. For instance the assembly may comprise a series of concentric tubes, aluminum for example, of varying diameters with an innermost tube and an outermost tube. There may be one or more intermediate tubes with the tubes being joined together at alternate axial ends in the manner which has been described for the illustrated nylon construction of compliant housing 54. The important function, regardless of construction, is to allow the other parts which are attached to the compliant housing to follow radial displacements of the reciprocating piston rod so that at all times the crown spring is fully effective in maintaining forceful engagement of the scraper with the piston rod. The compliant housing is unlike a rolling diaphragm in that the compliant housing is essentially incapable of axial displacement.

The illustrated construction is effective to allow an ultra-thin film of lubricant from the crankcase to pass through the scraper, but this will not cause serious consequences and may in fact be desirable. The entire lubricant control assembly is of course fully effective in maintaining separation of the crankcase from the cylinder.

The invention has therefore been shown to provide a worthwhile improvement in a lubricant control assembly.

What is claimed is:

1. In an engine having a housing comprising a cylinder within which a piston reciprocates and a piston rod extending from the piston through a bore which extends in said housing from said cylinder to a crankcase and a lubricant control assembly which is disposed within said bore in cooperative arrangement with said piston rod and functions to separate the cylinder from the crankcase while allowing the piston rod to reciprocate axially through a lubricant control portion of the lubricant control assembly which is in forceful contact around the piston rod, the improvement which comprises a crown spring comprising a base and means extending from said base for acting upon the lubricant control portion to forcefully urge the lubricant control portion into forceful contact around the piston rod, and means yieldably mounting the base of said crown spring on the engine housing to allow the crown spring to be radially displaced with respect to said bore and thereby follow radial displacement of the reciprocating piston rod while maintaining substantially full effectiveness in forcefully urging the lubricant control portion forcefully around the piston rod.

2. In an engine having a housing comprising a cylinder within which a piston reciprocates and a piston rod extending from the piston through a bore which extends in said housing from said cylinder to a crankcase and a lubricant control assembly which is disposed within said bore in cooperative arrangement with said piston rod and functions to separate the cylinder from the crankcase while allowing the piston rod to reciprocate axially through a lubricant control portion of the lubricant control assembly which is in forceful contact around the piston rod, the improvement which comprises a tubular part fitting over the piston rod, means cooperatively relating said lubricant control portion to said tubular part such that at least a portion of the lubricant control portion is disposed axially clear of said tubular part, a crown spring comprising a base supported on said tubular part and means extending from said base for acting upon the lubricant control portion where the lubricant control portion is axially clear of said tubular part to forcefully urge the lubricant control portion into forceful contact around the piston rod, and means yieldably mounting said tubular part on the engine housing to allow said tubular part to be radially displaced with respect to said bore and thereby follow radial displacement of the reciprocating piston rod which maintaining substantially full effectiveness in urging the lubricant control portion forcefully around the piston rod.

3. The improvement set forth in claim 2 in which said lubricant control portion comprises a tubular scraper fitted closely onto the piston rod and also having an axial fit with said tubular part.

4. In an engine having a housing comprising a cylinder within which a piston reciprocates and a piston rod extending from the piston through a bore which extends in said housing from said cylinder to a crankcase and a lubricant control assembly which is disposed within said bore in cooperative arrangement with said piston rod and functions to separate the cylinder from the crankcase while allowing the piston rod to reciprocate axially through a lubricant control portion of the lubricant control assembly which is in forceful contact around the piston rod, the improvement which comprises a compliant housing, said compliant housing being operatively disposed between the engine housing and the lubricant control portion to allow the lubricant control portion to be radially displaced with respect to said bore and thereby comply with radial displacement of the reciprocating piston rod while maintaining substantially full effectiveness of the lubricant control portion acting on the piston rod, said compliant housing comprising an axially extending inner ring portion disposed circumferentially around the piston rod, an axially extending outer ring portion via which the compliant housing mounts on the engine housing, and means joining said inner and outer ring portions to allow the inner ring portion to be displaced radially with respect to said bore and hence comply with radial displacement of the reciprocating piston rod, and means for attaching said lubricant control portion to said inner ring portion, said means joining said inner and outer ring portions comprising one or more axially extending intermediate ring portions disposed between said inner and outer ring portions, each such intermediate ring portion joining at one axial end thereof to the immediately radially outer ring portion and at its opposite axial end to the immediately radially inner ring portion, said inner ring portion comprising a free distal end extending axially of the compliant housing, said means for attaching said lubricant control portion to said inner ring portion comprising means for attaching said lubricant control portion to the free distal end of said inner ring portion, said lubricant control portion comprising a tubular scraper fitting closely onto the piston rod, and said means for attaching said lubricant control portion to the free distal end of said inner ring portion comprising an axially extending part attaching at one axial end to the free distal end of said inner ring portion and at the opposite axial end having a fit with the tubular scraper, and further including force-applying means separate from the scraper but acting to force the scraper into forceful contact around the piston rod, said force-applying means comprising a base supported on said part and means extending from said base to act upon the scraper and urge it into forceful contact around the piston rod.

5. The improvement set forth in claim 4 in which said scraper and said part have an axial fit but with the scraper having an end which is disposed axially beyond said part, said force-applying means being constructed and arranged to apply force to the scraper around the end thereof which is disposed axially beyond said part.

6. The improvement set forth in claim 5 in which said force-applying means comprises a crown spring, said base being the base of said crown spring and being of circular shape fitting onto said part, said crown spring further having an axial portion extending axially from said base and extending into a radially inwardly directed portion via which force is applied to the scraper.

7. The improvement set forth in claim 6 further including a buffer disposed between said radially inwardly directed portion of said crown spring and said scraper.

8. The improvement set forth in claim 7 further including an outer part fitting over the first-mentioned part, said crown spring, and said scraper, said outer part having an axial wall via which it attaches to said first-mentioned part and a radial wall which radially overlaps said scraper and crown spring, and said buffer having a sealing contact with said radial wall.

9. The improvement set forth in claim 8 further including a ring fitting over said scraper and cooperatively arranged with respect to both said first-mentioned part and said scraper for assisting in axially locating said scraper relative to said first-mentioned part, said buffer also having a sealing contact with said ring.

10. In an engine having a housing comprising a cylinder within which a piston reciprocates and a piston rod extending from the piston through a bore which extends in said housing from said cylinder to a crankcase and a lubricant control assembly which is disposed within said bore in cooperative arrangement with said piston rod and functions to separate the cylinder from the crankcase while allowing the piston rod to reciprocate axially through a lubricant control portion of the lubricant control assembly which is in forceful contact around the piston rod, the improvement which comprises a compliant housing for mounting the lubricant control assembly on the engine housing, said compliant housing being operatively disposed between the engine housing and the lubricant control portion to allow the lubricant control portion to be radially displaced with respect to said bore and thereby comply with radial displacement of the reciprocating piston rod while maintaining substantially full effectiveness of the lubricant control portion acting on the piston rod, said lubricant control assembly comprising a tubular part, means attaching said tubular part to said compliant housing such that said tubular part can comply with radial displacement of the reciprocating piston rod, and force-applying means acting between said tubular part and said lubricant control portion for urging said lubricant control portion into forceful contact around the reciprocating piston rod.

11. The improvement set forth in claim 10 in which said compliant housing comprises an axially extending inner ring portion disposed circumferentially around the piston rod, an axially extending outer ring portion via which the compliant housing mounts on the engine housing, and means joining said inner and outer ring portions to allow the inner ring portion to be displaced radially with respect to said bore and hence comply with radial displacement of the reciprocating piston rod, and means for attaching said lubricant control portion to said inner ring portion.

12. The improvement set forth in claim 11 in which said means joining said inner and outer ring portions comprises one or more axially extending intermediate ring portions disposed between said inner and outer ring portions, each such intermediate ring portion joining at one axial end thereof to the immediately radially outer ring portion and at its opposite axial end to the immediately radially inner ring portion.

13. The improvement set forth in claim 12 in which said outer ring portion comprises a screw thread via which the compliant housing threads into a complementary screw thread of said bore to mount the compliant housing on the engine housing.

14. The improvement set forth in claim 12 further including a cap seal disposed on said further ring portion for sealing around the reciprocating piston rod.

15. The improvement set forth in claim 12 in which said compliant housing comprises a one-piece unitary element.

16. The improvement set forth in claim 12 in which said inner ring portion, said outer ring portion, and said one or more axially extending intermediate ring portions comprising circular cylindrical walls which axially overlap each other and are in substantial parallelism with each other in the free state of said compliant housing.

17. The improvement set forth in claim 12 in which said inner ring portion comprises a free distal end extending axially of the compliant housing, said means for attaching said lubricant control portion to said inner ring portion comprising means for attaching said lubricant control portion to the free distal end of said inner ring portion.

18. The improvement set forth in claim 17 in which said lubricant control portion comprises a tubular scraper fitting closely onto the piston rod, and said means for attaching said lubricant control portion to the free distal end of said inner ring portion comprises an axially extending part attaching at one axial end to the free distal end of said inner ring portion and at the opposite axial end having a fit with the tubular scraper.

19. The improvement set forth in claim 12 in which said compliant housing comprises a unitary one-piece element made of a polymeric material.

20. The improvement set forth in claim 19 in which said unitary one-piece element comprises a single intermediate ring portion between said outer ring portion and said inner ring portion with said inner ring portion having a free distal end projecting axially of the unitary one-piece element, said single intermediate ring portion joining at one axial end with the axial end of the inner ring portion which is opposite the free distal end thereof and the opposite axial end of the single intermediate ring portion joining with the outer ring portion, said means for attaching said lubricant control portion to the compliant housing comprising means attaching the lubricant control portion to the free distal end of said inner ring portion.

21. The improvement set forth in claim 10 in which said lubricant control portion comprises a tubular scraper fitting closely onto the piston rod, said force-applying means comprising a base supported on said tubular part and means extending from said base to act upon the scraper urging it into forceful contact around the piston rod, said scraper and said tubular part having an axial fit but with the scraper having an end which is disposed axially beyond said tubular part, and said force-applying means being constructed and arranged to apply force to the scraper around the end thereof which is disposed axially beyond said tubular part.

22. The improvement set forth in claim 21 in which said force-applying means comprises a crown spring, said base being the base of said crown spring and being of circular shape fitting onto said part, said crown spring further having an axial portion extending axially from said base and extending into a radially inwardly directed portion via which force is applied to the scraper.

23. The improvement set forth in claim 22 further including a buffer disposed between said radially inwardly directed portion of said crown spring and said scraper.

24. The improvement set forth in claim 23 further including an outer part fitting over the first-mentioned part, said crown spring, and said scraper, said outer part having an axial wall via which it attaches to said first-mentioned part and a radial wall which radially overlaps said scraper and crown spring, and said buffer having a sealing contact with said radial wall.

25. The improvement set forth in claim 24 further including a ring fitting over said scraper and cooperatively arranged with respect to both said first-mentioned part and said scraper for assisting in axially locating said scraper relative to said first-mentioned part, said buffer also having a sealing contact with said ring.

* * * * *